United States Patent Office 3,489,499
Patented Jan. 13, 1970

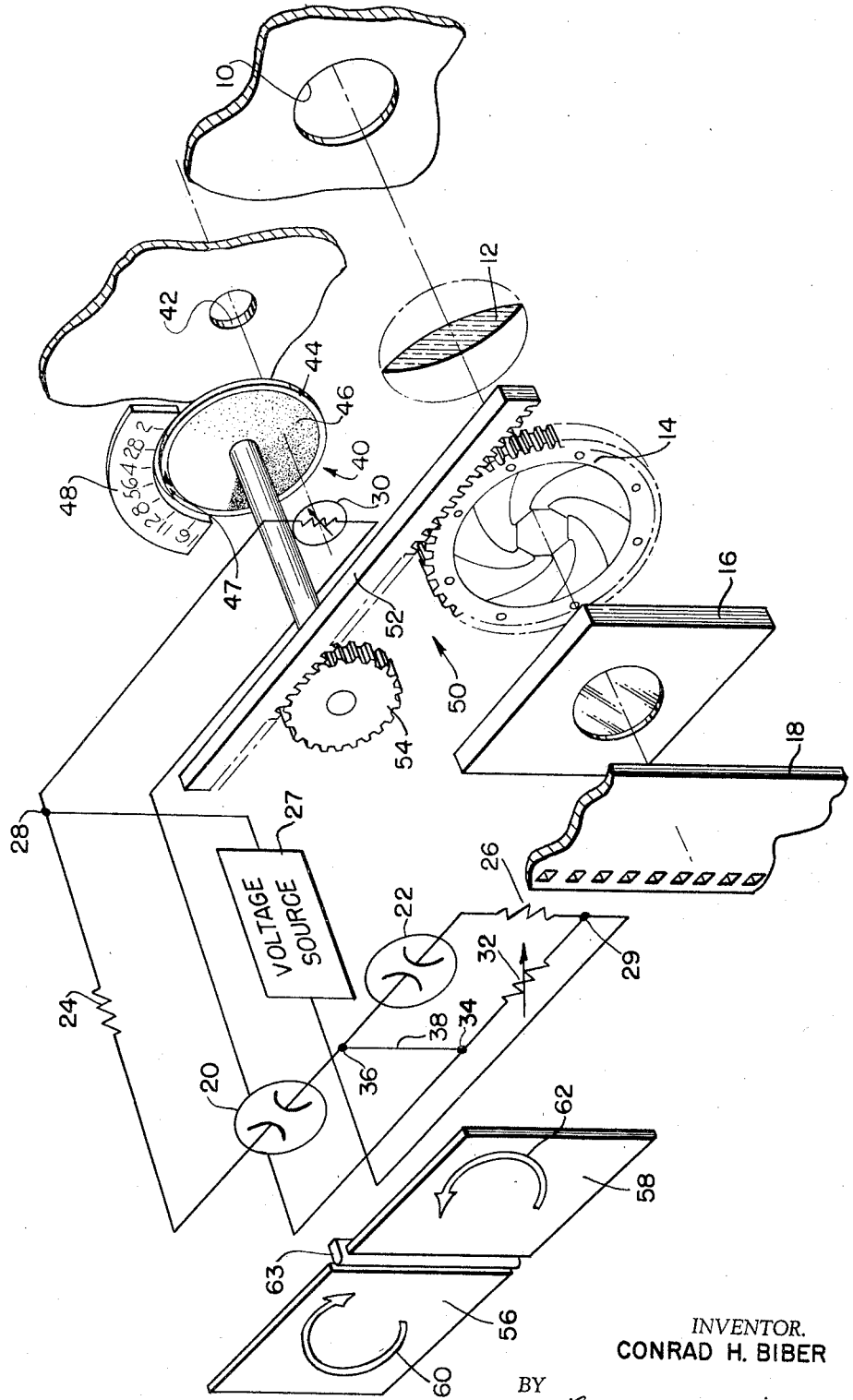

3,489,499
PHOTOGRAPHIC PHOTOMETRIC APPARATUS
Conrad H. Biber, Needham, Mass., assignor to Polaroid Corporation, Cambridge, Mass., a corporation of Delaware
Filed Dec. 27, 1965, Ser. No. 516,239
Int. Cl. G01j 1/42
U.S. Cl. 356—225                                              7 Claims

ABSTRACT OF THE DISCLOSURE

Photometric apparatus for determining a photometric value corresponding to the brightness of the field of illumination. The apparatus utilizes two electric discharge lamps within a light sensitive voltage dividing circuit. Activation of one of the lamps alone indicates that the selected exposure factor value is greater than a correct value. Activation of the other lamp alone indicates that the selected value is less than a correct exposure factor value. The concurrent activation of both lamps provides the predetermined positive signal indicating a selection of a correct exposure factor value.

---

This invention relates to photometric apparatus for indicating the selection of a photometric value corresponding to the brightness of a measured field of illumination. More particularly, this invention relates to photographic photometric apparatus for indicating when an appropriate exposure factor value has been selected.

A photometer designed for use in or with a photographic camera should possess certain desirable characteristics. One desirable characteristic is that such photometric apparatus yield a positive signal or other positive indication when an exposure factor value within a narrow range of appropriate values has been selected. The apparatus should not only yield a positive signal when an appropriate exposure factor value within a narrow controllable range of appropriate values has been selected, but preferably, should also indicate positively whether a selected exposure factor value which is not appropriate is greater than or less than the range of appropriate values in order that the operator may more easily and quickly find the range of appropriate values.

The utilization of signal means energized to yield a positive signal at selected exposure factor values both within and without the range of appropriate values is also desirable from the standpoint that the operator will know at all times when the apparatus is functioning. With apparatus utilizing the absence of a positive signal to indicate the selection of appropriate or inappropriate values, the operator is unable to distinguish between the selection of such values and the condition wherein the apparatus is inoperative.

Accordingly, it is the primary object of this invention to provide photographic photometric apparatus which yields a predetermined positive visual signal indicating the selection of an exposure factor value within a narrow range of values appropriate for the scene brightness and the photosensitive materials employed.

It is another object of this invention to provide photographic photometric apparatus which yields a predetermined positive visual signal when an exposure factor value within a narrow range of appropriate values has been selected, and which also yields distinct positive signals indicating whether a selected exposure factor value which is not appropriate is greater than or less than the range of appropriate values.

Briefly, the subject invention concerns photometric apparatus having three positive output states, a predetermined one of these positive states indicating the selection of an appropriate exposure factor value. The other two output states are distinct from each other and from the predetermined output state and signal whether the selected exposure factor value is greater than or less than a correct value. Thus the apparatus indicates the direction in which to seek a correct exposure factor value. Apparatus implementing the inventive concept may take the form of a serially connected pair of electric discharge lamps energized from a source of supply voltage through a voltage-dividing network, one element of which network comprises a photoconductive element exposed to light from the scene to be photographed. The division of voltage on the voltage-dividing network may be selectively adjusted by including a potentiometer in the voltage-dividing network or by selectively attenuating the scene light admitted to the photoconductive element. Activation of one of the lamps alone indicates that the selected exposure factor value is greater than a correct exposure factor value. Activation of the other lamp alone indicates that the selected exposure factor value is less than a correct value. The concurrent activation of both lamps provides the predetermined positive signal indicating the selection of a correct exposure factor value. With all components of the apparatus properly calibrated, the operator can easily find a correct exposure factor value as he varies the adjustable element in the voltage-dividing network by discerning which or both of the lamps are activated.

Other objects of the invention will in part be obvious and will in part appear hereinafter.

The invention accordingly comprises the apparatus possessing the construction, combination of elements, and arrangement of parts which are exemplified in the following detailed disclosure, and the scope of the application of which is indicated in the claims.

For a fuller understanding of the nature and objects of the invention, reference should be had to the following detailed description taken in connection with the accompanying drawing wherein:

The single figure schematically illustrates one embodiment of the invention.

Referring to the drawing, one possible structural implementation of applicant's inventive concept is diagrammatically shown. The novel photometric apparatus is shown in the drawing figure as being adapted for use in a camera including an exposure aperture 10, an objective lens 12, a variable diaphragm 14, a shutter mechanism 16, and a sheet 18 of photosensitive material.

In order to provide visually perceptible three-state signaling, the subject apparatus includes a pair of electric discharge lamps 20, 22 controlled by a control circuit. Current-limiting resistors 24, 26 connected with lamps 20, 22, respectively, limit the current which may pass through the discharge lamps 20, 22 during conduction thereof. A source 27 of supply voltage is connected across the lamps 20, 22 and resistors 24, 26.

In order to selectively apportion the supply voltage between the lamps 20, 22, a voltage-dividing network is connected across terminals 28 and 29. The voltage-dividing network includes a photoconductive element 30 and in series therewith a potentiometer 32. A terminal 34 between the photoconductive element 30 and the potentiometer 32 is electrically connected to a terminal 36 between the lamps 20, 22 by a lead 38.

In order that the division of voltage on the voltage-dividing network can be selectively varied, variable light-attenuating means 40 is provided. The light-attenuating means 40 is disposed between the photoconductive element 30 and an opening 42 through which light from the scene is admitted to the photoconductive element 30. The light-attenuating means 40 comprises, in the embodiment illustrated, a disc 44 rotatably mounted on a shaft 45. The disc 44 incorporates a graded density filter 46. A portion of the disc 44 may project into access of the operator in order that the disc 44 can be manually rotated thereby. The disc 44 may have an index mark 47 thereon which may be used in conjunction with appropriate indicia 48 to illustrate the selected exposure factor value. By way of example, the indicia 48 is shown as indicating a range of $f$-numbers.

The novel photometric apparatus may be operated as a separate instrument, or, as illustrated in the drawing, the apparatus may be coupled directly to one or more elements comprising the exposure control apparatus in a camera. In the figure of the drawing, a coupling means 50 comprising a rack 52 and pinion 54 on shaft 45 translate angular movement of disc 44 into an aperture setting of the variable diaphragm 14.

As stated above, only one lamp will be activated if the selected exposure factor value is greater than a correct value. The other lamp only will be activated if the selected exposure factor value is less than a correct value. In order to best utilize the information yielded by this three-state signaling arrangement, a pair of mask plates 56, 58 are provided. Arrow-shaped windows 60, 62 in plates 56, 58, respectively, indicate to the operator the direction in which to rotate the disc 44 to reach the correct exposure factor value. A baffle 63 between the lamps 20, 22 prevents cross-illumination of the mask plates 56, 58 by the lamps 20, 22.

The operation of the illustrated apparatus is as follows: As the disc 44 is rotated in search of an appropriate relative aperture value, the amount of scene light admitted through the opening 42 and the filter 46 to the photoconductive element 30, and hence the resistance of the element 30, changes. At a signal condition wherein the selected relative aperture value is correct for the scene brightness and photosensitive materials used, the photoconductive element 30 has a predetermined resistance value which effects a division of the supply voltage across the voltage-dividing network such that a voltage greater than the respective threshold voltage of each of the lamps 20, 22 is applied thereto. At this condition both of the lamps 20, 22 are concurrently activated to provide the predetermined positive signal indicating the selection of a correct relative aperture value. If a relative aperture value is selected which is numerically smaller (larger aperture size) than a correct value, the disc 44 will be positioned such that the filter 46 allows too much scene light to impinge upon the element 30. Thus the resistance of element 30 will be less than the predetermined value and the division of voltage on the voltage-dividing network will be such that the voltage applied to lamp 20 will be less than its threshold voltage. Lamp 20 will be deactivated, lamp 22 alone being activated to indicate, by means of window 62 in plate 58, the direction (counterclockwise) in which disc 44 must be rotated to reach a correct relative aperture value. Similarly, if the selected relative aperture value is numerically too great (aperture size is too small), filter 46 will attenuate an excessive amount of scene light, causing lamp 22 to be deactivated. Lamp 20 illuminating plate 56 indicates that the disc 44 must be rotated in a clockwise direction to reach a correct aperture value.

It is evident then that the apparatus yields three distinct positive signals. The singular activation of lamp 20 indicates the selection of a relative aperture value which is numerically greater than a correct value; the singular activation of lamp 22 indicates that a relative aperture value has been selected which is numerically less than a correct value. The concurrent activation of both lamps 20, 22 signals the attainment of the signal condition wherein the selected relative aperture value is correct for the scene brightness and the photosensitive materials employed.

The proper operation of the apparatus depends upon the selection of discharge lamps 20, 22 having threshold voltage such that the sum of the threshold voltage of lamp 20 and the threshold voltage of lamp 22 is a predetermined amount less than the value of the supply voltage. The difference between the value of the supply voltage and the sum of the threshold voltage values of the lamps 20, 22 defines the latitude of the signal condition. Thus the accuracy of the apparatus can be controlled by the proper selection of discharge lamps and supply voltage values.

The above described photometric apparatus is particularly suited for use with or incorporation in a camera; however, such apparatus could be used in other than photographic applications for indicating the selection of a photometric value corresponding to the brightness of any measured field of illumination. Certain other changes may be made in the above apparatus without departing from the scope of the invention herein involved. For example, the supply voltage may be alternating so that lamps 20, 22 will blink when activated, or the supply voltage may be constant, lamps 20, 22 then providing a constant output when activated. Lamps 20, 22 may be of the incandescent type although the discharge type are preferred. A linearly movable filter or optical wedge or a diaphragm might be substituted for the illustrated disc 44 and filter 46. As an alternative to using a graded density filter as a means for varying the division of voltage on the voltage-dividing network, the filter may be eliminated and the potentiometer 32 varied to control the apportionment of voltage between the lamps 20, 22. A further possibility is to utilize a second photoconductive cell in place of the potentiometer 32 and a filter arrangement effective to admit scene light to the photoconductive elements in inversely varying quantites. That is, as the filter would admit greater scene light to one element, it would admit less to the other. Any of a number of other coupling arrangements would be satisfactory. As intimated above, the means accomplishing the selected variations in the voltage on the voltage-dividing network might also be coupled to the shutter mechanism to control the shutter speed or to both the diaphragm and the shutter mechanism.

It is therefore intended that all matter contained in the above description or shown in the accompanying drawing shall be interpreted as illustrative and not in a limiting sense.

What is claimed is:

1. A photographic photometric apparatus providing positive visual indications of an appropriate narrow range of exposure factor values applicable to a scene to be photographed comprising:

adjustable means for the selection of various photometric settings;

photosensitive means having an electrical parameter variable in response to the light levels of said scene;

first indicating lamp means for visually indicating, when energized alone, that the selected setting represents an exposure factor greater than said appropriate exposure factor range;

second indicating lamp means for visually indicating, when energized alone, that the selected setting represents an exposure factor less than said appropriate exposure factor range;

a source of supply potential for energizing said first and second indicating lamp means; and selective energization circuit means responsive to said electrical parameter and to said adjustable means for energizing said first indicating lamp means from said source when the selected setting is greater than or equal to said appropriate exposure factor range and for energizing said second indicating lamp means from said source when said selected setting is less than or equal to said appropriate exposure factor range.

2. The invention defined by claim 1 including indicating means responsive to the output produced by said first and second indicating lamp means individually and conjointly for indicating the direction of adjustment of said adjustable means to reach said appropriate exposure factor range.

3. The invention defined by claim 1 wherein said first indicating lamp means comprises an electric discharge lamp responsive to applied voltages above a first threshold voltage and wherein said second indicating lamp means comprises an electrical discharge lamp responsive to applied voltages above a second threshold voltage, the sum of said first and second threshold voltages being less than said supply potential.

4. The invention defined by claim 3 wherein said selective energization circuit means comprises a voltage-dividing network coupled with said photosensitive means.

5. Photographic photometric apparatus providing a predetermined positive visual signal at a signal condition indicating the selection of an exposure factor value appropriate for the scene brightness and the photosensitive materials employed, comprising:

a first lamp responsive to applied voltages above a first threshold voltage for indicating, when activated alone, a deviation from said signal condition in one direction;

a second lamp responsive to applied voltages above a second threshold voltage for indicating, when activated alone, a deviation from said signal condition in the opposed direction, said first and second lamps being concurrently activated at said signal condition to provide said predetermined positive signal;

a source of supply voltage for energizing said first and second lamps;

conductor means for applying said source of supply voltage across said first and second lamps, the sum of said first and second threshold voltages being less than said supply voltage;

a voltage-dividing network dividing said supply voltage between said first and second lamps;

a photoconductive element disposed in said voltage-dividing network and exposed to light from the scene to be photographed; and adjustable means for selectively varying the division of voltage on said network, whereby at a critical setting of said adjustable means at said signal condition the division of voltage on said network is such that a voltage greater than said first threshold voltage is applied to said first lamp and a voltage greater than said second threshold voltage is applied to said second lamp, said first and second lamps being concurrently activated to signal the selection of said appropriate exposure factor value.

6. The invention defined by claim 5 wherein said adjustable means comprises light-attenuating means attenuating the scene light admitted to said photoconductive element.

7. The invention defined by claim 6 including indicating means responsive to the illumination produced by said lamps individually and conjointly for indicating the direction of adjustment of said light-attenuating means to reach said signal condition.

References Cited

UNITED STATES PATENTS

| | | |
|---|---|---|
| 1,762,748 | 6/1930 | Smith. |
| 2,149,250 | 3/1939 | Bing. |
| 2,453,693 | 11/1948 | Armstrong et al. |
| 2,750,453 | 6/1956 | Pritchard. |
| 3,019,700 | 2/1962 | Colman. |
| 3,049,964 | 8/1962 | Miller et al. |
| 3,155,952 | 11/1964 | Boehm et al. |
| 3,208,365 | 9/1965 | Cooper et al. |
| 3,227,056 | 1/1966 | Leiser. |
| 3,313,224 | 4/1967 | Biedermann. |
| 3,323,430 | 6/1967 | Cooper. |
| 3,321,754 | 5/1967 | Grimm et al. _____ 307—318 |

JEWELL H. PEDERSEN, Primary Examiner

WARREN A. SKLAR, Assistant Examiner

U.S. Cl. X.R.

95—10, 64; 315—153; 340—228; 356—227